United States Patent
Iwamura

(10) Patent No.: US 7,323,968 B2
(45) Date of Patent: Jan. 29, 2008

(54) CROSS-PHASE ADAPTER FOR POWERLINE COMMUNICATIONS (PLC) NETWORK

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 227 days.

(21) Appl. No.: 11/299,224

(22) Filed: Dec. 9, 2005

(65) Prior Publication Data

US 2007/0136766 A1    Jun. 14, 2007

(51) Int. Cl.
*H04M 11/04* (2006.01)

(52) U.S. Cl. ............... 340/310.18; 340/310.14; 340/310.16; 340/310.17

(58) Field of Classification Search ........... 340/310.12, 340/310.13, 310.14, 310.15, 310.16, 310.17, 340/310.18; 333/24 R, 100; 370/203, 254; 375/130, 258

See application file for complete search history.

(56) References Cited

U.S. PATENT DOCUMENTS

| | | | | |
|---|---|---|---|---|
| 4,131,805 A * | 12/1978 | Austin et al. ............... | 307/147 |
| 4,188,619 A * | 2/1980 | Perkins .......................... | 307/3 |
| 4,481,501 A * | 11/1984 | Perkins .......................... | 307/13 |
| 4,763,104 A * | 8/1988 | Inoue et al. ............ | 340/310.11 |
| 5,521,491 A | 5/1996 | Najam ............................ | 324/86 |
| 5,625,863 A * | 4/1997 | Abraham ..................... | 725/79 |
| 5,694,108 A * | 12/1997 | Shuey ..................... | 340/538.16 |
| 5,933,073 A * | 8/1999 | Shuey ......................... | 375/258 |
| 6,407,987 B1 * | 6/2002 | Abraham ..................... | 370/295 |
| 6,980,091 B2 * | 12/2005 | White et al. ............... | 340/5.53 |
| 7,098,773 B2 * | 8/2006 | Berkman ..................... | 370/485 |
| 7,242,729 B1 * | 7/2007 | Heistermann et al. ...... | 375/329 |
| 2005/0001693 A1 | 1/2005 | Berkman ..................... | 333/24 |

* cited by examiner

*Primary Examiner*—Van T. Trieu
(74) *Attorney, Agent, or Firm*—John L. Rogitz

(57) ABSTRACT

An adapter to reduce the effects of cross phase communication between a PLC transmitter plugged into one of the L1 or L2 power lines of a home and a PLC receiver plugged into the opposite L2 or L1 power line includes a housing with one side configured as a 240 volt plug and an opposite side configured as a 240 volt, so that the adapter can be plugged into a 240 volt wall socket and a 240 volt appliance plugged into the adapter. A coupler or a repeater is in the adapter and extends between the L1 and L2 lines to reduce attenuation of a communication signal from the transmitter or alternatively to amplify the signal and send it on to the receiver. A high frequency filter can be interposed between the coupler and the 240 volt appliance to prevent noise from the appliance from entering the communication signal and for preventing communication signals from entering the appliance.

20 Claims, 3 Drawing Sheets

Block Diagram of Cross Phase Adapter

Figure 1 Cross Phase Path

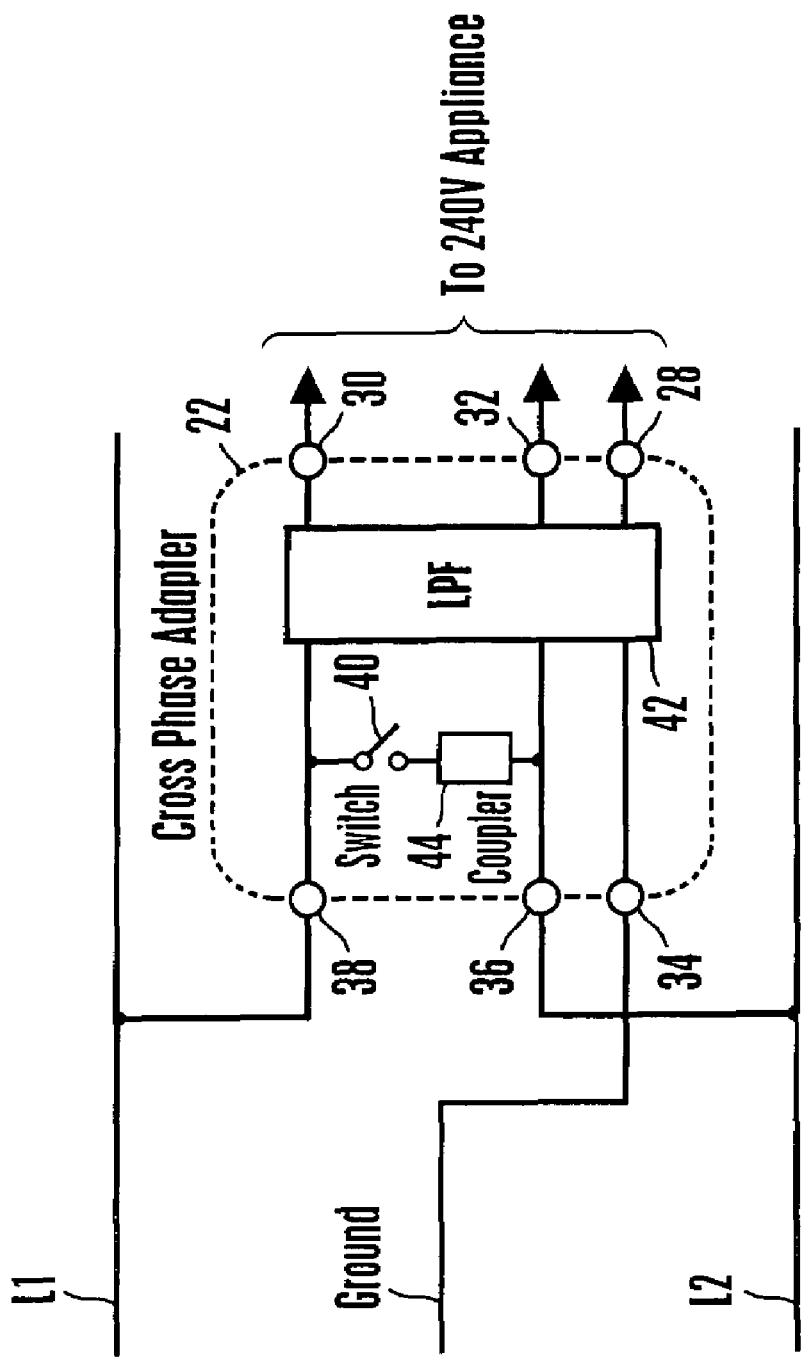
Figure 3 Block Diagram of Cross Phase Adapter

CROSS-PHASE ADAPTER FOR POWERLINE COMMUNICATIONS (PLC) NETWORK

FIELD OF THE INVENTION

The present invention relates generally to home entertainment systems.

BACKGROUND OF THE INVENTION

Home entertainment systems have been provided that can include a set-top box media server that communicates with various components in the home, e.g., TVs, laptop computers, and custom display devices. To establish network communication paths, power line communication (PLC) networks have been introduced and have gained in popularity owing to the fact that the home's existing AC power grid is used to also carry entertainment data between various components in the home entertainment system which are plugged into AC wall sockets. In this way, no new wiring is required, rendering most home power grids into effective network backbones.

The present invention makes the following critical observation. Most U.S. homes use a single-phase three-line electricity system in which three lines (L1 and L2 "hot" lines at 120 volts each, plus a neutral line) are provided to each home. Sockets in the home are 120 volt sockets that have two or three connections, one to neutral and one to the L1 line or the L2 line and, when three connections are provided, the third to ground. Some 240 volt sockets may also be provided for 240-volt appliances, for example, for laundry dryers, with a 240 volt socket being connected to both the L1 and L2 lines in an additive fashion to produce the desired 240 volt power supply.

As critically recognized herein, when a PLC transmitter is plugged into a socket connected to, e.g., the L1 line, and a PLC receiver is plugged into a socket that is connected to other (e.g., L2 ) line, cross phase communication occurs that can result in significant signal attenuation, indeed of twenty decibels or more. This undesirable outcome significantly reduces network bandwidth. With these critical recognitions in mind, the present invention is provided.

SUMMARY OF THE INVENTION

A home entertainment system includes an L1 line, an L2 line, and a neutral line. A power line communication transmitter is connected to the L1 line (or to the L2 line), and a power line communication receiver is connected to the L2 line (or to the L1 line). Means that connect the L1 line to the L2 line are provided for ameliorating communication signal attenuation therebetween. This means for ameliorating communication signal attenuation may be a coupler such as a capacitor, or the means for ameliorating can be a repeater-amplifier. If desired, means can also be provided for impeding noise from a 240 volt appliance from propagating to the receiver.

As set forth further below, the means for ameliorating and means for impeding can be contained in a housing that is configured with a 240 volt plug and a 240 volt socket. A switch can selectively interconnect the means for ameliorating to the L1 and L2 lines.

In another aspect, an adapter includes a housing, a 240 volt plug on the housing, and a 240 volt socket on the housing. A neutral pathway is in the housing, as is an L1 line pathway and an L2 line pathway. The three pathways extend between the plug and the socket. A coupling device interconnects the L1 line pathway and the L2 line pathway to reduce the effects of cross phase communication between a PLC transmitter and a PLC receiver.

In still another aspect, an adapter includes a coupling device engageable with a 240 volt wall socket to interconnect an entertainment system transmitter communicating with a first non-neutral line in a power grid of a dwelling having a PLC network with an entertainment system receiver communicating with a second non-neutral line in the power grid.

BRIEF DESCRIPTION OF THE DRAWINGS

The details of the present invention, both as to its structure and operation, can best be understood in reference to the accompanying drawings, in which like reference numerals refer to like parts, and in which:

FIG. 3 is a block diagram of a non-limiting cross-phase adapter circuit.

DETAILED DESCRIPTION OF THE PREFERRED EMBODIMENTS

Figure 1:
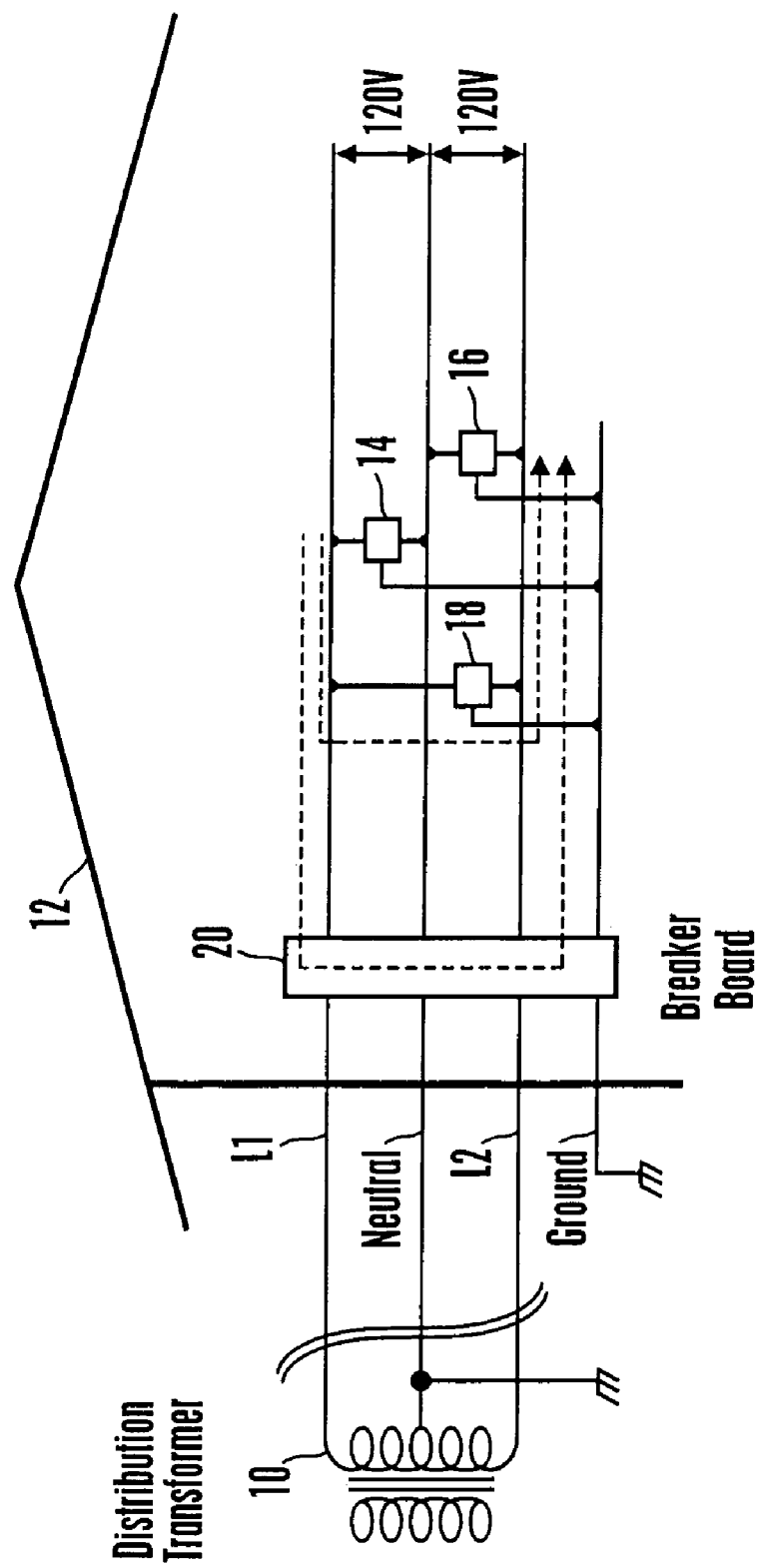
FIG. 1 is a block diagram of a non-limiting home entertainment system.

Referring initially to FIG. 1, a home entertainment system is shown to illustrate an environment in which the present cross-phase adaptor can be used. A distribution transformer 10 provides power to a structure 12, with the structure 12 having a power grid including a neutral line generally at ground potential, an L1 line that is at a 120 volt potential relative to neutral, and an L2 line that likewise is at a 120 volt potential relative to neutral, with 240 volt s of potential existing between the lines L1, L2.

Accordingly, 120 volt devices 14, 16 can be plugged into respective 120 volt sockets connected to neutral and to one of the L1 or L2 lines, whereas a 240-volt appliance 18, for example, a laundry dryer can be plugged into a 240 volt socket that is connected across both the L1 and L2 lines as figuratively shown. As recognized above, when both of the transmitter and the receiver in a home entertainment network are plugged into sockets on the same line (L1 or L2), no problem occurs, but if the transmitter is plugged into a socket on one line and the receiver is plugged into a socket connected to the other line, cross phase communication can undesirably cause signal attenuation. This coupling typically occurs at the power grid breaker board 20 or at the 240 volt device 18.

Figure 2:
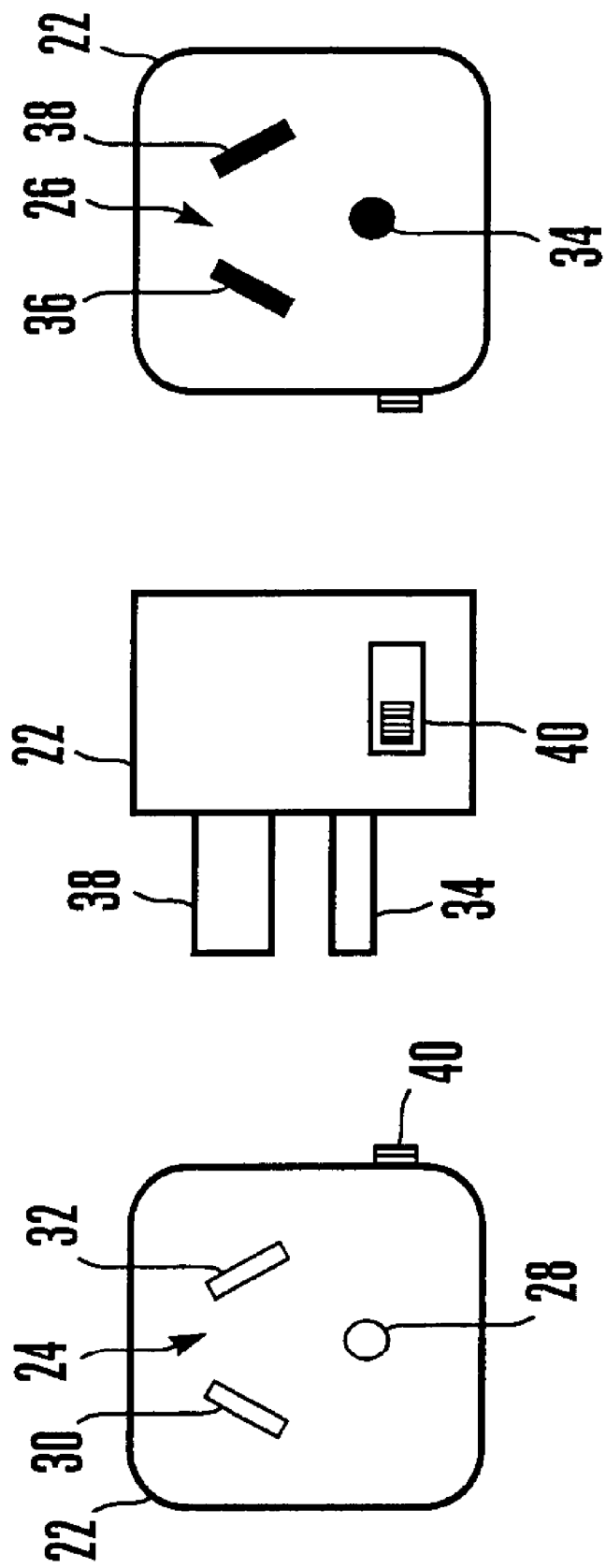
FIG. 2 shows bottom, side, and top views of a non-limiting cross-phase adaptor.

To ameliorate the effects of signal degradation when a PLC network transmitter such as an entertainment system server is plugged into a L1 line socket and a PLC network receiver such as a TV is plugged in a L2 line socket (or vice-versa), the adaptor of the present invention, a preferred implementation of which is shown in FIG. 2, is provided. To avoid the necessity of a skilled electrician, in one implementation the adapter is configured as a 240 volt adapter, as shown in FIG. 2. In this implementation, the adapter includes a preferably plastic housing 22 that has a bottom configured as a 240 volt socket 24 and, opposed to the bottom 24, a top configured as a 240 volt plug 26. In the specific embodiment shown, the socket 24 has a round ground hole 28, a rectilinear L1 channel 30, and a rectilinear L2 channel 32, with the channels 30, 32 lying along sides of what would be an equilateral triangle and, thus being oriented obliquely relative to each other. Likewise, the plug 26 has a round ground rod 34, a rectilinear L1 prong 36, and a rectilinear L2 prong 38, with the prongs 36, 38 lying along sides of what would be an equilateral triangle and, thus being oriented obliquely relative to each other. A manipulable switch 40 may also be provided on the housing 22 for purposes to be shortly disclosed.

With this structure, the plug 26 of the adapter can be plugged into a 240-volt wall socket. Then, a 240-volt appliance, for example, a laundry dryer, can be plugged into the socket 24 of the adapter, to engage the adapter with the house power grid as described further below without requiring electrical work by a qualified electrician.

With greater specificity to the operation of the adapter and now referring to FIG. 3, when the adapter is plugged into the 240 volt wall socket to engage it as shown with the ground, L1, and L2 lines, a low-pass filter 42 within the housing 22 and connected to each of the ground, L1, and L2 paths within the housing 22 blocks high frequencies, for example, more than 100 kHz, from passing to a 240 volt appliance that might be plugged into the adapter socket. In this way, no power line communication signal goes to the 240-volt appliance, but only electrical power to energize the appliance. Likewise, no noise that might be generated by the 240-volt appliance is passed through the adapter to the L1/L2 line.

When the switch 40 is closed, as it typically will be, a coupling device 44 connects the L1 line with the L2 line as shown, with the coupling device 44 passing powerline communication signals between the L1 and L2 lines. In one embodiment the coupling device 44 may be a coupler. In a specific embodiment the coupler may be established by a capacitor. The coupling device 44 attenuates PLC signals less than they would otherwise be attenuated without the adapter, so that cross phase communication is faster and more reliable. In the event that a second (or more) adapter is used, the switch in the second adapter is turned to the open position to prevent multipaths, or depending on outlet topography, may be turned to the closed position if multi-path communication renders better communication results.

In lieu of a coupler, a repeater-amplifier may be used as the coupling device. When an incoming signal is attenuated, the repeater amplifies the signal to a certain level and sends the amplified signal to the other line. As yet another alternative, a bridge may be used as the coupling device. The bridge stores the list of devices on L1 and L2 and forwards only cross-phase communications, with in-phase communications (L1 to L1 or L2 to L2) not being forwarded. Accordingly, an in-phase communication never uses the cross-phase bandwidth so that the bandwidth of both lines is efficiently used. When there is no cross-phase communication (in the ideal case), L1 and L2 are completely isolated from each other and the bandwidth is 200%.

The adapter housing 22 preferably is small and thin for space considerations.

The above invention, the skilled artisan may now appreciate that the cross phase adapter disclosed herein reduces cross phase attenuation to promote faster and more reliable communication. Also, the adapter blocks electric noise caused by a 240-volt appliance from the PLC network, and is compact and easy to use. Only passive components are needed in the coupler-only embodiment.

While the particular CROSS-PHASE ADAPTER FOR POWERLINE COMMUNICATIONS (PLC) NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

What is claimed is:

1. A home entertainment system, comprising:
   an L1 line, an L2 line, and a neutral line;
   a power line communication transmitter connected to a first one of the L1 line and L2 line;
   a power line communication receiver connected to a second one of the L1 line and L2 line; and
   means connecting the L1 line to the L2 line for ameliorating communication signal attenuation therebetween.

2. The system of claim 1, comprising means for impeding noise from a 240 volt appliance from propagating to the receiver.

3. The system of claim 2, wherein the means for ameliorating and means for impeding are contained in a housing configured with a 240 volt plug and a 240 volt socket.

4. The system of claim 1, wherein the means for ameliorating includes a coupler.

5. The system of claim 4, wherein the coupler is a capacitor.

6. The system of claim 1, wherein the means for ameliorating includes at least one of a repeater-amplifier or a bridge.

7. The system of claim 1, comprising a switch selectively interconnecting the means for ameliorating to the L1 and L2 lines.

8. An adapter, comprising:
   a housing;
   a 240 volt plug on the housing;
   a 240 volt socket on the housing;
   a ground pathway in the housing;
   an L1 line pathway in the housing;
   an L2 line pathway in the housing, wherein the pathways extend between the plug and the socket; and
   a coupling device interconnecting the L1 line pathway and the L2 line pathway to reduce the effects of cross phase communication between a Power Line Communications (PLC) transmitter and a PLC receiver.

9. The adapter of claim 8, further comprising a filter connected to all three pathways to block high frequency signals.

10. The adapter of claim 8, further comprising a switch on the housing to selectively interconnect the coupling device with the L1 and L2 line pathways.

11. The adapter of claim 8, wherein the coupling device includes a coupler.

12. The adapter of claim 11, wherein the coupler is a capacitor.

13. The adapter of claim 8, wherein the coupling device includes at least one of a repeater-amplifier or a bridge.

14. An adapter, comprising:
   a coupling device engageable with a 240 volt wall socket to interconnect an entertainment system transmitter communicating with a first non-neutral line in a power grid of a dwelling having a PLC network with an entertainment system receiver communicating with a second non-neutral line in the power grid.

15. The adapter of claim 14, wherein the coupling device is disposed in a housing configured with a 240 volt plug and a 240 volt socket.

16. The adapter of claim 15, further comprising a switch on the housing to selectively interconnect the coupling device with the L1 and L2 lines.

17. The adapter of claim 14, further comprising a filter configured to block high frequency signals.

18. The adapter of claim 14, wherein the coupling device includes a coupler.

19. The adapter of claim 18, wherein the coupler is a capacitor.

20. The adapter of claim 14, wherein the coupling device includes at least one of a repeater-amplifier or a bridge.

* * * * *